US008438186B2

(12) United States Patent
Lee

(10) Patent No.: US 8,438,186 B2
(45) Date of Patent: May 7, 2013

(54) METHOD AND APPARATUS FOR CREATING TOPOLOGICAL FEATURES INSIDE A DATABASE SYSTEM

(75) Inventor: Frank Lee, Carlisle, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1505 days.

(21) Appl. No.: 11/293,486

(22) Filed: Dec. 2, 2005

(65) Prior Publication Data

US 2007/0130172 A1 Jun. 7, 2007

(51) Int. Cl.
*G06F 7/00* (2006.01)

(52) U.S. Cl.
USPC .......................................................... 707/792

(58) Field of Classification Search ............... 707/1, 792
See application file for complete search history.

(56) References Cited

U.S. PATENT DOCUMENTS

| | | | |
|---|---|---|---|
| 5,713,014 A | 1/1998 | Durflinger | |
| 5,901,315 A | 5/1999 | Edwards | |
| 6,314,429 B1 | 11/2001 | Simser | |
| 6,353,923 B1 | 3/2002 | Bogle | |
| 6,865,573 B1 | 3/2005 | Hornick | |
| 6,959,307 B2 | 10/2005 | Apte | |
| 7,107,578 B1 | 9/2006 | Alpern | |
| 7,158,974 B2 | 1/2007 | Williams | |
| 7,185,016 B1 | 2/2007 | Rasmussen | |
| 2005/0007383 A1* | 1/2005 | Potter et al. | 345/619 |
| 2005/0097108 A1 | 5/2005 | Wang | |

OTHER PUBLICATIONS

Radius Topology, "Enterprise Solutions for your spatial data" http://www.laser-scan.com/pdf/rt_overview_english.pdf Sep. 29, 2005.
Wilko Quak, Jantien Stoter and Theo Tijssen, "Topology in spatial DBMSs", Delft University of Technology.
Paul Watson, "Topology and ORDBMS Technology," Prepared for Laser-Scan Ltd, Jan. 2002.
Chuck Murray, "Oracle(R) Spatial Topology and Network Data Models, 10g Release 1(10.1)" Part No. B10828-01, Oracle Corporation, 2003, Chapters 1 & 2.
Paul Watson, Topology and ORDBMS Technology, Technology White Paper, Jan. 2002, Laser-Scan Inc.
Chuck Murray, "Oracle Spatial Topology and Network Data Models, 10g Release 1 (10.1)" Part No. B10828-01, Oracle Corporation, 2003, Chapter 6.

(Continued)

*Primary Examiner* — Cam-Linh Nguyen
*Assistant Examiner* — Ajith Jacob
(74) *Attorney, Agent, or Firm* — Vista IP Law Group, LLP

(57) ABSTRACT

A technique used in a relational database management system that provides a topology data model in which topological elements are stored in topology element tables. The technique allows topological elements to be added to the topology element tables while a feature specifier that represents a feature composed of the topological elements is being defined in the topology data model. The feature specifiers are inserted into fields of a feature column in a feature table. The features belonging to a given feature table define a feature layer. A feature layer may have a child feature layer, and in addition to representing a set of topological elements, a feature specifier may represent a set of features belonging to a child feature layer.

38 Claims, 11 Drawing Sheets

OTHER PUBLICATIONS

Terence C. Lau et al., Migrating E-Commerce Database Applications to an Enterprise Java Environment, IBM Press, 2001, pp. 1-11.
http://archive.devx.com/dbzone/articles/sqlj/sqlj03/sqlj040202-5.asp.

http://www.kiv.zcu.cz/~otta/vyuka/db2/doc/plsql.pdf, Users Guide and Reference Release 7.1.5 date 1999, Section C, pp. 555-558.

* cited by examiner

SDO_TOPO_MAP.CREATE_FEATURE

Format (no topology geometry layer hierarchy or lowest level in a hierarchy)

```
SDO_TOPO_MAP.CREATE_FEATURE(
    topology      IN VARCHAR2,
    table_name    IN VARCHAR2,
    column_name   IN VARCHAR2,
    geom          IN SDO_GEOMETRY
) RETURN SDO_TOPO_GEOMETRY;
```
— 1003

— 1004

Format (parent level in a hierarchy)

```
SDO_TOPO_MAP.CREATE_FEATURE(
    topology      IN VARCHAR2,
    table_name    IN VARCHAR2,
    column_name   IN VARCHAR2,
    dml_condition IN VARCHAR2
) RETURN SDO_TOPO_GEOMETRY;
```
— 1005

Description

Creates a feature from Oracle Spatial geometries. (Intended to be used for inserting rows into a feature table.)

- The first format (with the geom parameter and without the dml_condition parameter) is for creating a feature in a topology without a topology geometry layer hierarchy or in the lowest level of a topology with a topology geometry layer hierarchy.

- The second format (with the dml_condition parameter and without the geom parameter) is for creating a feature in a parent level of a topology with a topology geometry layer hierarchy.

Parameters

1007  topology
Topology having the associated specified feature table and feature column.

1009  table_name
Name of the feature table containing the feature column specified in column_name.

1011  column_name
Name of the feature column (of type SDO_TOPO_GEOMETRY) containing the topology geometries.

1013  geom
Geometry objects.

1015  dml_condition
For topologies with a topology geometry layer hierarchy:
DML condition for selecting rows from a child layer to be inserted into a parent layer. Specify the condition in a quoted string, but without the word WHERE. For example, to select only rows where the STATE_ABBR column value is MA, specify the following:
`'state_abbr=''MA'''`

Fig. 10

```
                                            1103
                                           /        1105   1107          1109
                                          /          /    /              /
    ┌─ 1102 FOR sign_rec IN (SELECT name, geometry FROM traffic_signs_geom) LOOP
    │       ┌─ INSERT INTO traffic_signs VALUES(sign_rec.name,─────── 1111
1101┤  1110 ┤  SDO_TOPO_MAP.CREATE_FEATURE('CITY_DATA', 'TRAFFIC_SIGNS', 'FEATURE',
    │       └─   sign_rec.geometry));
    └─ END LOOP;                    \
                    \                 1113
                     1112
```

```
                                         1123
                              1117  1121 /   1125
                                /    /  /    /                          1119
                               /    /  /    /                           /
        ┌─ insert into sc_p_areas (f_name, p_name, feature) values ('NH', 'US',
    1115┤  sdo_topo_map.create_feature('SC','SC_AREAS','FEATURE','p_name="
        └─   NH"'));
                       /      /   /            \
                  1126/  1127/   /              1131
                           1129/
```

Fig. 11

METHOD AND APPARATUS FOR CREATING TOPOLOGICAL FEATURES INSIDE A DATABASE SYSTEM

CROSS-REFERENCE TO RELATED APPLICATIONS

This application is closely related to U.S. Ser. No. 11/293,487, Frank Lee, et al., Incorporating network constraints into a network data model for a relational database management system, which has the same assignee as the present application and is being filed on even date with the present application.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The invention relates generally to database systems and more specifically to techniques for manipulating topological features in a database management system.

2. Description of Related Art

Representing Spatial Information

Spatial information is information that describes an object in terms of two- or three-dimensional space. One example of spatial information is a map of a city. Historically, techniques for representing spatial information in computer systems have developed separately from techniques for representing non-spatial information. Non-spatial information such as information about employees or financial information has generally been represented by sets of tables in a relational database management system. The information has been stored in rows in the tables and relationships between items of information have been represented by the presence of the items in a row of a table or by relationships between rows of the tables. Spatial information has typically not been represented by sets of tables in relational database management systems. This difference between the way non-spatial information and the way spatial information have been represented and stored in computer systems has caused problems for the users of the data. For example, in a government entity that depends on property taxes for revenue, it is desirable that the information used to collect property taxes be closely linked to the descriptions of the property on which the taxes are collected, so that, for example, a map of the property being taxed was part of the property tax records and a change to the property map resulting from a real estate transaction would automatically result in a corresponding change in the tax records.

A first approach to storing spatial information such as property descriptions in relational database management systems was to describe each piece of property and entities such as streets, lakes, or rivers as polygons on a grid. This geometric representation of spatial data had a number of problems. One problem with this mode of storing information was that it did not take into account the fact that adjacent pieces of property shared one or more boundaries, rather than having separate boundaries. Consequently, when the boundary of one piece of property changed, the effect of that change on adjacent pieces that shared the boundary had to be taken into account. If that was not done, holes developed in the property database. To prevent holes, one had to figure out what pieces of property were adjacent to the one whose boundaries had been changed. Doing this was computationally intensive. Another problem with the geometric approach was that it was difficult to make a geometric representation of spatial information which was equivalent to a typical map—that provided a single representation of all of the relevant information. An example is a subdivision map that shows not only the boundaries of the property but the streets, the sanitary and storm sewerage, the water, power, and information distribution systems, the street lights, the traffic signals, and so forth.

Topological Representations of Spatial Data FIGS. 3-5

These and other problems of geometric representations of spatial data were solved by the adoption of topological representations of spatial data. Topology describes the characteristics of a geometric figure which are invariant under continuous deformation of the coordinate space. For example, a CD is topologically identical to a funnel—just deform the disc by pressing its center downwards. Calculating properties such as adjacency, colinearity, and containment from geometrical representations is computationally intensive. Topological representations allow these expensive geometric comparison algorithms to be recast as simple combinatorial search algorithms.

FIG. 3 shows a topology 301 to which geometric information can be added to make the topology into a representation of parcels of property, streets, and traffic signs. The basic elements in a topology are its nodes 305, edges 303, and faces 307. A node, represented by a point, can be isolated or it can be used to bound edges. Two or more edges meet at a non-isolated node. A node has a coordinate pair associated with it that describes the spatial location for that node. Examples of geographic entities that might be represented as nodes include start and end points of streets, places of historical interest, and airports (if the map scale is sufficiently large). An edge is bounded by two nodes: the start (origin) node and the end (terminal) node. An edge has an associated geometric object, usually a coordinate string that describes the spatial representation of the edge. An edge may have several vertices making up a line string. (Circular arcs are not supported for topologies.) Examples of geographic entities that might be represented as edges include segments of streets and rivers. The order of the coordinates gives a direction to an edge, and direction is important in determining topological relationships. The positive direction agrees with the orientation of the underlying edge, and the negative direction reverses this orientation. Each orientation of an edge is referred to as a directed edge, and each directed edge is the mirror image of its other directed edge. The start node of the positive directed edge is the end node of the negative directed edge. An edge also lies between two faces and has references to both of them. Each directed edge contains a reference to the next edge in the contiguous perimeter of the face on its left side. In FIG. 3, the arrowheads on each edge indicate the positive direction of the edge (or, more precisely, the orientation of the underlying line string or curve geometry for positive direction of the edge). A face, corresponding to a polygon, has a reference to one directed edge of its outer boundary. If any island nodes or island edges are present, the face also has a reference to one directed edge on the boundary of each island. Examples of geographic entities that might be represented as faces include parks, lakes, counties, and states.

Continuing with Details about FIG. 3,

E elements (E1, E2, and so on) are edges 303, F elements (F0, F1, and so on) are faces 307, and N elements (N1, N2, and so on) are nodes 305. Thus, edge E14 is labeled 303(14), node N11 is labeled 305(11), and face F8 is labeled 307(8).

F0 (face zero) is created for every topology. It is the universal face containing everything else in the topology. There is no geometric information associated with the universal face. F0 has the face ID value of −1 (negative 1).

There is a node created for every point geometry and for every start and end node of an edge. For example, face F1 has a closed bounding edge E1 that begins and ends at same node N1. F1 also contains edge E25, with start node N21 and end node N22.

An isolated node (also called an island node) is a node that is isolated in a face. For example, node N4 is an isolated node in face F2.

An isolated edge (also called an island edge) is an edge that is isolated in a face. For example, edge E25 is an isolated edge in face F1.

A loop edge is an edge that has the same node as its start node and end node. For example, edge E1 is a loop edge starting and ending at node N1.

An edge cannot have an isolated (island) node on it. The edge can be broken up into two edges by adding a node on the edge. For example, if there was originally a single edge between nodes N16 and N18, adding node N17 resulted in two edges: E6 and E7.

As long as the relationships between nodes, edges, and faces remain unchanged in the topology of FIG. 3, the locations of the components relative to each other can change, as well as the forms of the components. For example, the topology formed by N5, E4, N6, N7, and E5 in FIG. 3 is equivalent to any topology formed by three nodes which are connected by two edges that share a node where both of the edges are directed to the shared node.

When a topology is used to represent spatial information, information is added to the nodes, edges, and faces of the topology to specify features in the spatial information that are represented by the nodes, edges, and faces. A feature is a spatial representation of a real world object. The feature is stored in the topology as a set of topological elements (here, nodes, edges, and faces). For example, some faces might represent parcels of real estate, some edges might represent streets, and some nodes might represent street lights. There are two kinds of such added information: what kind of feature the elements belonging to the feature represent, and the geometry of the feature, that is, its location in a system for specifying the locations of nodes and faces. FIG. 4 shows topology 401 which is identical to topology 301 except that a system for specifying locations of elements has been applied to it. Here the system is a two-dimension grid 403. Using the grid, one can specify the location of each node in topology 401 by means of a pair of coordinates, the location of each edge by means of the coordinates of the nodes at which the edge starts and ends and the coordinates of each of its corners, and the location of each face by means of the corner coordinates of a minimum bounding rectangle for the face; thus, node N22 is at (13,35), edge E1 has vertices (8,30); (16,30); (16,38); (3,38); (3,30); (7,30); and face E1 is at (3,30);(15, 38); the universal face, however, does not have a bounding rectangle.

FIG. 5 shows how information is added which completes the definition of the dimensioned nodes, edges, and faces of FIG. 4 as features. In featured topology 501, there are three kinds of features: point features 503, represented by large dots, linear features 505, represented by dashed lines, and area features 507, represented by closed polygons (here, rectangles). What a given point feature, linear feature, or area feature represents in a given set of spatial data will depend on the user; here, all of the point features represent traffic signals, all of the linear features represent streets, and all of the area features represent parcels of property. It should be noted here that the parcel of property represented by area feature P5 contains a hole, shown at 509; this represents an area contained in P5 that is not part of that parcel of property.

Defining and Manipulating Topologies with Features in an Object Relational Database System: FIG. 1

FIG. 1 shows a first prior-art system 101 for defining and manipulating topologies with features in an object relational database system. System 101 is an Oracle 9i object relational database system on which a Radius Topology spatial processing environment has been installed. The Oracle 9i object relational database system is manufactured by Oracle Corporation, of Redwood City, Calif. and the Radius Topology spatial processing environment is manufactured by Laser-Scan, Cambridge, England. An overview of the Radius Topology spatial processing environment may be found in Paul Watson, *Topology and ORDBMS technology*, published 2002 by Laser-Scan and available as of September, 2005 at www.laser-scan.com/pdf/topo_ordbms.pdf.

In system 101, object relational database system server 102 is simply the system in which the topology data is stored and manipulated. The object-relational database system provides a built-in type for geometric data, but the manner in which topology data is stored and manipulated is determined completely by non-RDBMS-supplied topology engine 113 and the tables 108 used to store the topology data and the code used to manipulate it are defined by the makers of topology engine 113. Server 102 includes the following standard database system features: an Oracle 9i object relational database system 107, a set of language drivers 110 which permits the use of various programming languages to specify operations in database 107, SQL and PL/SQL engine 112, which manipulates the data in object-relational database 107, and object-relational database 107 itself. One of the drivers is Oracle Call Interface 111, which permits applications 103 to specify database system operations in C code, as shown at arrow 137, and which translates the specified operations into the SQL and PL/SQL code that is executed by engine 112.

Within database system 107 are stored tables 108 containing topology data. The elements of the topology are contained in topology element tables 109. The form of these tables is defined by topology engine 113. For a given topology, there is a node table 127 which has a row for each node of the topology, an edge table 129, which has a row for each edge of the topology, and a face table 131 which has a row for each face of the topology. Contained in the row for each of the elements is information about the relationships of the elements to neighboring elements and the location of the element as specified in the system that is used to specify locations in the given topology.

The topology data is organized into features by topology engine feature table 117 and topology engine feature table view 126. These tables, too, are set up and maintained by topology engine 113. By executing programs in topology programs 116, a user of topology engine 113 may create features consisting of nodes, edges, and/or faces defined in the topology's topology tables 108 and perform operations on the data in topology tables 108 in terms of those features. For example, if a feature consists of all of the street signs in the topology and a new street sign is to be added, the user of engine 113 need only specify that a street sign is to be added and its location; engine 133 will execute programs 116 as required to add the street sign to the street sign feature and will create a node for the street sign in node table 127. Engine 113 will perform its operations in response to programs executing in server 102 or in response to input from clients of server 102 which are connected to server 102 by a network.

Topology engine 113 is a program that executes on server 102. Feature table triggers 119 are user-defined database system triggers. A trigger is code that is executed in the database system in response to an event that occurs in the database system. The trigger specifies the kind of event which is to cause its execution and the trigger's code is executed when the event occurs. In the case of feature table triggers 119, the trigger code executes a call back.

Operation of topology engine 113 will be described using the example of adding a street sign described above. The street sign feature is defined in feature table 117; consequently, a change in the feature requires a change in table 117, and the change in table 117 will require changes in other tables in tables 108. An input from a client spatial application to topology engine 113 specifies that the street sign be added to the topology; topology engine 113 responds to the input by executing C code 137 specifying that feature table view 126 be modified to add the new street sign to the street sign feature. OCI interface 111 generates the SQL 135 required to modify feature table view 126. The modification of feature table view 126 causes a trigger 119 to be executed. Trigger 119 executes callback code that modifies topology engine feature table 117 as required by the modification of feature table view 126. If the operation involves adding, deleting, or modifying a node, edge, or face, the callback code will specify an operation on the relevant table in topology element tables 109. In this case, the operation is adding a row to node table 127. The row is for the node that represents the new street sign.

Server 102 with spatial processing environment 132 does permit users of spatial applications 103 to deal with topology data in terms of features and is consequently effective for its purpose; however, it does not provide a general mechanism available to all users of server 102 for organizing topology data into features. Further, the technique of using triggers on feature table 126 to do callbacks to Java callback code 133 is relatively inefficient, particularly if the modifications involve a large number of features.

Overview of an Object Relational Database System in Which Features may be Created and Edited: FIG. 2

FIG. 2 shows the server portion 202 of a prior-art system 201 in which the topology data and operations have been completely integrated into an object relational database system. In the following, the integrated topology data and operations are termed the Oracle Topology Data Model or OTDM. System 201 will be termed in the following "OTDM system 201". OTDM system 201 has been implemented in the Oracle 10gR1 object relational database system and uses that system's language drivers 110 and SQL and PL/SQL engine 212. OTDM system 201 operates in two modes: a topological editing mode, in which it edits topology element tables 237, and a management mode, in which it creates and manages a topology, defines features in the topology, and uses spatial data 221 to determine topological relationships between elements of spatial data 221, but does not edit topology element tables 237. Operations from the different modes may be freely mixed. Within server 202, PL/SQL is used for both modes. There is also a Java client interface for the topological editing mode. The management mode interface is shown at 222; the editing mode interface is shown at 226. The code which is executed by OTDM system 201, finally, is contained in OTDM-defined programs 216. Included in this code are spatial APIs 222 and 226. There are PL/SQL and Java versions of programs 216; either is available via APIs 222 and 226. The PL/SQL version of programs 216 consists of PL/SQL routines which are wrappers for Java routines of programs 216.

OTDMS system 201 includes OTDMS-defined spatial data 221. spatial data 221 includes node table 251, edge table 253, and face table 255, which respectively contain rows describing nodes, edges, and faces, and which together make up topology element tables 237. Spatial data 221 also includes topology and spatial metadata 249, which is data about the spatial information in topology element tables 237. Included in the metadata are indexes 239 which include spatial indexes 243 and B-tree indexes 241. Spatial data 221 also includes relation table 224, which relates nodes, edges, and faces in tables 237 to features. Each feature has a feature specifier (FS), each row 223 in relation table 224 relates a FS to a node, edge, or face that is a component of the feature by relating the row for the node, edge, or face in any of tables 251, 253, and 255 to the FS, as shown by arrow 225. Relation table 224 may further relate a given row in any of these tables to any number of features. Also included in spatial metadata 249 is B-tree index 245 on relation table 224.

User-defined feature tables 227 may be defined with columns 231 which represent layers of features. Each such column represents a layer and the column's values are FS's 233 which specify features belonging to the layer; a row 229 in such a feature table 227 thus relates other information about a particular feature of a layer to the elements belonging to the feature in any of tables 251, 253 and 255. To continue with the street sign example, feature table 227 would be a street sign data table that has an entry for every street sign in the topology, with the FS 233 for the entry specifying the street sign's place in the topology and the other information dealing with things like when the street sign was installed, what kind of street sign it is, what its current condition is, and when it is scheduled for replacement.

The last item of spatial metadata 249 is layer info view 247, which contains a row 246 for each layer that belongs to a feature table owned by a particular user of server 202. The row 246 relates the layer to a column in a user-defined feature table 227 belonging to a particular topology. Included in row 246 is an identification of the feature's layer. As shown by arrow 248, this identification also appears in the rows 223 of relation table 224 that specify elements of features belonging to the layer. In summary, view 247 relates feature layers to columns in feature tables; the feature specifiers 233 in a column 231 in a feature table specify features belonging to the column's layer; rows in relation table 224, finally, relate each feature to the rows in topology element tables 237 that contain the topological elements that make up the feature. An advantage of this arrangement is that a given topological element may belong to many different features.

Execution of operations on spatial data 221 in editing mode is speeded up in OTDM system 201 by the use of spatial data cache 215, which is a copy in memory of the portion of topological element tables 237 in a user-defined minimum bounding rectangle of the topology which is currently being edited by OTDM system 201.

Operation of OTDM System 201

Management Mode

In management mode, any application program can use OTDM system 201 to perform operations including the following:
creating and dropping topologies in spatial data 221;
creating and deleting feature layers in topologies of spatial data 221; the features in a layer are obtained from the FS values in a column of a feature table;

initializing the metadata for a topology; included in the metadata are indexes on the node, edge, and face tables;

exporting topologies to and importing them from other object relational database systems;

determining how other objects in a topology in spatial data 221 interact with a given set of the topology objects.

For example, the management mode could be used to create a feature layer that was made up of all of the street signs in the topology or to get a list of all of the street signs on a given street.

Topological Editing Mode: FIG. 6

The operations provided by interface 226 in topological editing mode include operations on the topo map, which is the cached portion 220 of the spatial data for a topology, operations on elements of the topology, and an operation which sets a FS field 233 in a row 229 of a feature table 227 to specify a feature in spatial data 221. Doing the operations in cache 215 increases the efficiency of reading and modifying the spatial data and also permits concurrent editing operations in non-overlapping areas of the topology.

The topo map operations include creating a topo map, loading it from spatial data 221, updating it after a series of topological editing operations, validating it, rolling it back to a previous state, dropping the topo map, and committing the topo map, that is, writing the information currently in the topo map back to spatial data 221.

The operations on the topological elements include adding, moving, and removing nodes and edges and updating the coordinates of an edge, as well as getting lists of nodes and edges, and getting information about nodes and edges.

FIG. 6 is a flowchart 601 of the operation of OTDM system 201 in topological editing mode. In broad overview, editing begins when a topo map is created and data loaded into it. Then editing proceeds as shown at 607. In the course of the editing, the topo map may be validated, updated, or committed. When the editing is finished, the topo map may be dropped or the cache cleared.

Continuing in more detail, the topo map object is created in cache 215 at 603; at 605, the spatial data for a topology or a portion of the spatial data for a topology is loaded into the topo map. The spatial data loaded into the cache includes data from topology element tables 247 and data from topology and spatial metadata 249. Then editing begins. As the editing operations 609 are performed, the user can periodically validate the topo map at 611. The validation operation checks the consistency of the topo map as it stands at the time of the validation operation. The user can also periodically rebuild the indexes used to speed access to edge and face information (613). To save the current state of the topo map in spatial data 221, the user performs the update topo map operation at 614 and 615. All edits on the topo map since the last update are written to spatial data 221 and editing then continues at that point, as shown by arrow 608. When the editing operation is done, the user may commit the updates to spatial data and the most recent changes to the topomap at 618 and 617 and that done, may remove the topo map from the cache (620,621) or simply clear the cache (622,619). Editing may then continue with a new topo map (arrow 625). Flowchart 601 applies equally to editing mode using JAVA API 219; the only difference is the function and procedure names employed in the API.

Features in OTDM System 201

The following discussion of features will first provide a functional overview of features, will then provide details of how features are represented in OTDM system 201, and will finally describe how feature tables are set up.

Functional Overview

As previously set forth, a feature is a spatial representation of a real world object. The feature is stored in a topology as a set of topological elements. Within a topology, the features are organized into layers. A layer is simply a set of features that belong together from the point of view of the maker of the topology. For example, in FIG. 5, the linear features 505 all represent streets and might be organized into a "street" layer, while the point features 503 might be organized into a "traffic sign" layer and the area features into a "land parcel" layer. Typically, there would be a feature table 227 corresponding to each layer with feature specifiers 233 representing the topological elements making up the layer. In the above examples, all of the features in a particular layer belonged to the same type; however, a layer may also contain features belonging to different types. Such a layer is termed a collection layer. An example of a collection layer in FIG. 5 would be one which was made up of the features related to the parcel P4, that is, the parcel, the traffic sign S4, and the street R4.

The feature layers of a topology may also be organized hierarchically. When the feature layers are organized hierarchically, a layer of the hierarchy may be the parent of another layer of the hierarchy. The other layer is then the child of the parent layer. A given layer of the hierarchy may have more than one parent layer, but a given parent layer may have only one child layer. The feature specifiers 233 of the parent layer may represent features whose elements are not topological elements, but rather are feature specifiers 233 in the child level, For example, a land use topology might have feature layers for features representing parcels of land. The feature layers would be organized as follows:

A States feature table has a state_parcels feature layer whose feature specifiers represent features whose elements are features represented by feature specifiers from a county_parcels feature layer which is the child of the state_parcels feature layer.

The county_parcels feature layer belongs to a Counties feature table. county_parcels' feature specifiers represent features whose elements are features represented by feature specifiers from a tract_parcels feature layer which is the child of the county_parcels feature layer.

The tract_parcels feature layer belongs to a Tracts feature table. tract_parcels' feature specifiers represent features whose elements are features represented by feature specifiers from a block_group_parcels feature layer which is the child of the tract_parcels feature layer.

The block_group_parcels feature layer belongs to a Block Groups feature table. block_group_parcels' feature specifiers represent features whose elements are features represented by feature specifiers from a parcels feature layer which is the child of the block_group_parcels feature layer.

The parcels feature layer belongs to a Land Parcels feature table. parcels is the lowest feature layer in the hierarchy. parcels' feature specifiers represent features whose elements are the topological elements that describe the actual parcels of land.

As can be seen from the foregoing, an important advantage of layers of hierarchies is that the topological elements which make up the features at all levels of the hierarchy need be specified only once, in the lowest level. The topological elements may be reached from any level of the hierarchy by working down the hierarchy until the bottom level of the hierarchy is reached. In a preferred embodiment, a feature layer at levels other than the lowest level of the hierarchy may have feature specifiers that represent features whose elements are either features represented by feature specifiers from the child level or topological elements.

Representing Features: FIG. 7

FIG. 7 presents at 701 details of how features are represented in user-defined feature tables 227 and OTDM-defined spatial data 221. Shown at 703 is an example feature table 227. Each of Street sign table 703's rows 229 contains information 705(*a*) and (*b*) about a single street sign feature. The feature, which is a point feature 503, is specified in row 229 by feature specifier 233. Feature specifier 233 is an object 707 of type SDO_TOPO_GEOMETRY. (topology geometry is a synonym of feature.) The type is defined by OTDM system 201. Objects of the type have the following attributes:

- TG_TYPE 709: Type of feature: 1=point or multipoint, 2=line string or multiline string, 3=polygon or multipolygon, 4=heterogeneous collection.
- TG_ID 711: Unique ID number (generated by system 201) for the feature.
- TG_LAYER_ID 713: ID number for the feature layer to which the feature belongs. (This number is generated by system 201. TG_LAYER_ID and TG_ID together uniquely identify the feature in the topology.)
- TOPOLOGY_ID 715: Unique ID number (generated by system 201) for the topology the feature belongs to.

The elements of a specified by a feature specifier 233 are represented by one or more rows in the RELATION$ table 224 for the topology. Each of the rows specifies an element of the feature and the layer the feature belongs to; if the features are organized into hierarchical layers, the element may be a feature represented by a feature specifier in the child layer of the layer; otherwise, it is a topological element of the feature. Shown at 717 is an example RELATION$ table. The columns of Example_RELATION$ table 717 and therefore the fields of its rows 223 that are relevant to the present discussion are the following:

- TG_LAYER_ID 719: ID number of the feature layer to which the feature belongs.
- TG_ID 721: ID number of the feature.
- TOPO_ID 723: For an element of the feature that is a topology element, ID number of the topology element; for a topology that has a feature layer hierarchy: Reserved for system use.
- TOPO_TYPE 725: For an element of the feature that is a topology element, the type of the topology element: 1=node, 2=edge, 3=face. For a topology that has a feature layer hierarchy: Reserved for system use.

When the element represented by the RELATION$ row is a feature that is represented by a feature specifier in a child layer, fields 723 and 725 contain information which permits location of the RELATION$ rows for the child layer's feature specifier. Navigation down the levels of a feature layer hierarchy can thus be performed within RELATION$ table 717.

As shown by arrows 716 and 718, each row 223 for a feature in table 224 has the layer ID for the layer the feature belongs to (0 if none is specified for the layer) and the ID for the feature itself. Further, as shown by arrow 727, each row that represents an element of the feature has the ID for the feature's topological element. Here, the features are street signs, which are point features 503, and consequently, the single node which is the element making up the feature is specified by a row in NODE$ table 251.

Feature layers are related to feature tables by layer info view 247, which in a preferred embodiment is a view called xxx_SDO_TOPO_INFO 731, where the xxx indicates the user to which the information in the view belongs. Shown in FIG. 7 are the details of row 246 in the view. There is a row 246 for each feature layer that is defined for the user to whom the table belongs. Information in the fields of the row that are of interest in the present context fall into three categories: information about the topology 741, information about the feature table 747, and information about a layer 759. In more detail, the fields are the following:

- OWNER 733: Owner of the topology.
- TOPOLOGY 735: Name of the topology.
- TOPOLOGY_ID 737: Number of the topology.
- SRID NUMBER 739: Coordinate system (spatial reference system) associated with all feature layers in the topology. Is null if no coordinate system is associated; otherwise, it contains a value from the SRID column of the MDSYS.CS_SRS table.
- TABLE_SCHEMA 743: Name of the schema that owns the table containing the feature layer column.
- TABLE_NAME 745: Name of the table containing the feature column.
- COLUMN_NAME 749: Name of the column containing the FS 233.
- TG_LAYER_ID 751: Number of the layer to which the features specified by the feature specifiers in the column belong.
- TG_LAYER_TYPE 753: Contains the type of the features belonging to the layer. The type may be one of the following: POINT, LINE, CURVE, POLYGON, or COLLECTION. (LINE and CURVE have the same meaning.)
- TG_LAYER_LEVEL 755: Hierarchy level number of the feature layer specified at 751.
- CHILD_LAYER_ID 757: The TG_LAYER_ID of the child layer of the feature layer specified at 751 in the feature layer hierarchy. The value can be used to locate the child layer's row in layer info view 247. Null if this layer has no child layer or if the topology has no hierarchy.

As will be immediately apparent, tables 701 make it possible to get from feature specifier 233 to the rows for the feature in RELATION$ table 224 and from there to the rows for the elements making up the feature in tables 251, 253, and 255. Layer info view 247 also makes it possible to get from a layer ID to the feature table the layer's features belong to and to the column in the feature table that contains the feature specifiers 233 for the layer. RELATION$ table 224 and layer info view 247 also make it easy to determine which feature specifiers 233 are affected by changes in RELATION$ table 224 and which rows in table 224 are affected by changes in the feature specifiers or changes in rows in tables 251, 253, and 255. This in turn makes it easier to maintain consistency between feature specifier 233, rows 223 in table 224, rows 246 in view 247, and rows in tables 251, 253, and 255.

Prior-Art Technique for Defining Features: FIG. 8

In a prior-art version of system 201, features are built from elements that already exist in topology element tables 237. Because the elements already exist, the elements are referred to in the interface that is used to make features by their ID numbers in tables 237. Moreover, because the elements already exist, creation of the features does not modify information in element tables 237, and consequently, the features can be created in management mode.

Flowchart 801 of FIG. 8 gives the details of this prior-art technique for creating features. As shown at 803, the method of the flowchart can only begin after the topology to which the feature belongs has been created and its topology element tables 237 have been loaded at least with the elements that belong to the features. The first step (805) is to make an empty feature table 227 for each feature. Included in each empty feature table is a column whose values are feature specifiers 233; in a preferred embodiment, these values have the type SDO_TOPO_GEOMETRY, shown at 707 in FIG. 7. If RELATION$ table 717 does not already exist, the next step is to make an empty RELATION$ table 717 (807). Then a row is made for each layer in the feature table in layer information view 247. The row associates the name of the feature table, the name of the column for the feature layer's feature specifiers 233, the layer's layer ID and the type of the layer. (809). The layer id indicates the layer that features specified in the column for the feature specifiers belong to. If the layers are to be hierarchical, the user can indicate a layer that the layer being specified is a parent of, and that is indicated in the row as well.

When all of the feature tables have been thus processed (811), the feature specifiers for the features may be added to each feature table in turn. The processing for this stage of the method has two loops: an inner loop 823 which adds each feature to a given feature table and an outer loop 824 which processes each feature table in turn. At 815, processing of the current feature table begins. In inner loop 823, a row is created in relation table 224 for each element of each feature in the current feature table's layer and a feature specifier 233 is created for each feature in the current feature table for the feature and inserted into a row of the feature table (819). After all of the features have been processed for all of the tables (821,825), the topology is ready to be queried or edited (827). Among the querying operations is one which returns all objects in the topology which interact with the elements of a feature that is specified by its layer ID and feature ID.

A problem with the technique of FIG. 8 is that it separates the task of adding elements to topology element tables 237 from the task of organizing the elements into features and feature layers. Because this is the case, the elements that are being organized are already in topology element tables 237 and must be referred to when they are organized into features by their IDs in those tables. What this means for a user of system 201 is that he or she cannot make the elements into features as they are being added to table 237, but must instead keep track of the IDs assigned to the elements that make up a feature so that he or she can use those IDs later to make the elements into a feature A further disadvantage of the technique of FIG. 8 is that it cannot guarantee that the topological elements being added to tables 237 are consistent. It is an object of the invention disclosed herein to overcome these limitations and thereby provide an improved system 201.

BRIEF SUMMARY OF THE INVENTION

The foregoing object of the invention is achieved by a technique for making a feature specifier that represents a set of topology elements in a topology data model. In the technique, the topology elements for the feature are inserted into the topology element table as the feature specifier is made. When viewed as a method, the technique has the steps of receiving a specification of a set of topology elements, for each topology element in the set, making a row for the topology element in the topology element table if it does not yet have one, making a row in a relations table which relates the topology element's row to the feature specifier, and when rows have been made in the relations table for all of the topology elements in the set, providing the feature specifier.

In another aspect of the invention, the relational database system includes a feature table having a feature column whose values are feature specifiers and the method further includes the step of inserting the feature specifier into a field belonging to the feature specifier column in a row of the feature table. There may also be a number of feature tables and a specification of a feature table and a feature column in the feature table are received along with the specification of the set of topology elements.

In a further aspect of the invention, the features belonging to a given feature column make up a feature layer, and in the step of making a row in the relations table, the feature specifier is further related to a specifier for the feature layer.

A feature layer may have a child feature layer, and the topology data model includes a feature layer table which relates a parent feature layer to its child feature layer. The feature specifier may either represent a feature that is a set of topology elements or a feature that is a set of features from the child feature layer. In the latter case, what is specified is the parent feature layer and a set of the features belonging to the child feature layer and the rows in the relations table for the feature specifier relate the feature specifier to the features in the set of features belonging to the child feature layer. A feature level may include feature specifiers for both sets of topology elements and sets of features belonging to the child feature layer. Other objects and advantages will be apparent to those skilled in the arts to which the invention pertains upon perusal of the following Detailed Description and drawing, wherein:

BRIEF DESCRIPTION OF THE SEVERAL VIEWS OF THE DRAWINGS

FIG. 10 shows functions that implement part of the technique of the flowchart of FIG. 9; and FIG. 11 is examples of how the functions of FIG. 10 may be used.

DETAILED DESCRIPTION OF THE INVENTION

Figure 9:
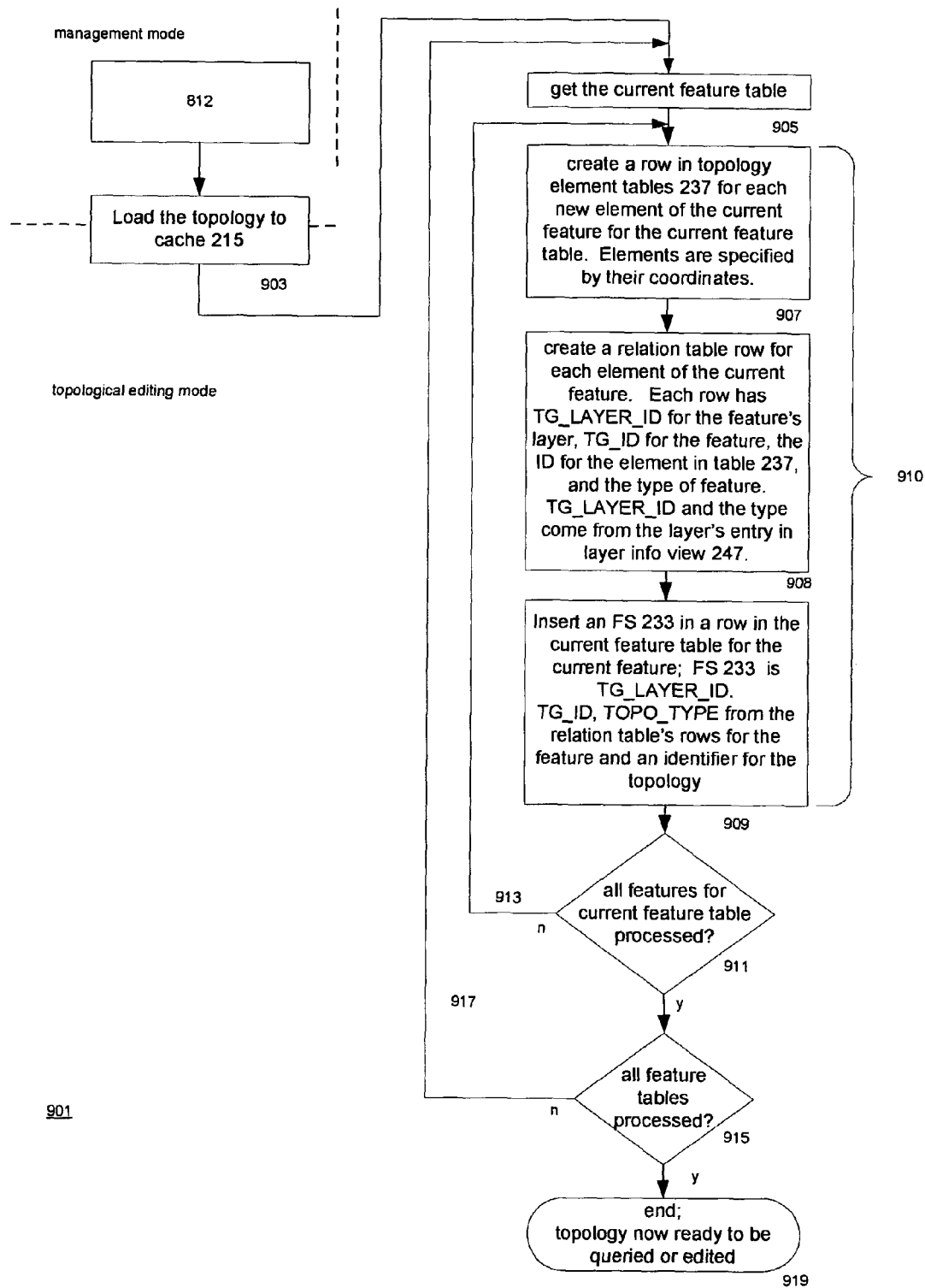
FIG. 9 is a flowchart of an improved technique for organizing elements into features in system 201.

Defining New Features While Inputting Elements to Topology Element Tables 237: FIG. 9

As already pointed out, difficulties with technique 801 for defining features are:
   that it requires that the topology elements belonging to the features are already present in topology element tables 237 and that the entity that is defining the feature know the IDs in tables 237 for the elements; and
   that the new topology elements cannot be checked for consistency with the topology as it currently exists as they are added to topology tables 237.

These difficulties are overcome by the technique 901 for defining features shown in FIG. 9.

The technique begins as did the prior-art technique 801, except that the elements of the feature have not yet been loaded into topology element tables 237. Thus, as indicated by box 812, a set of empty feature tables 227 has been made. Each column for a feature layer is included in one of the tables. Then an empty relation table 224 has been made; when that is done, a row is made in layer info view 247 for the current feature table and the current feature layer in the table. The latter process is continues until all of the feature tables have been processed. All of this is done in system 201's management mode.

Figure 6:
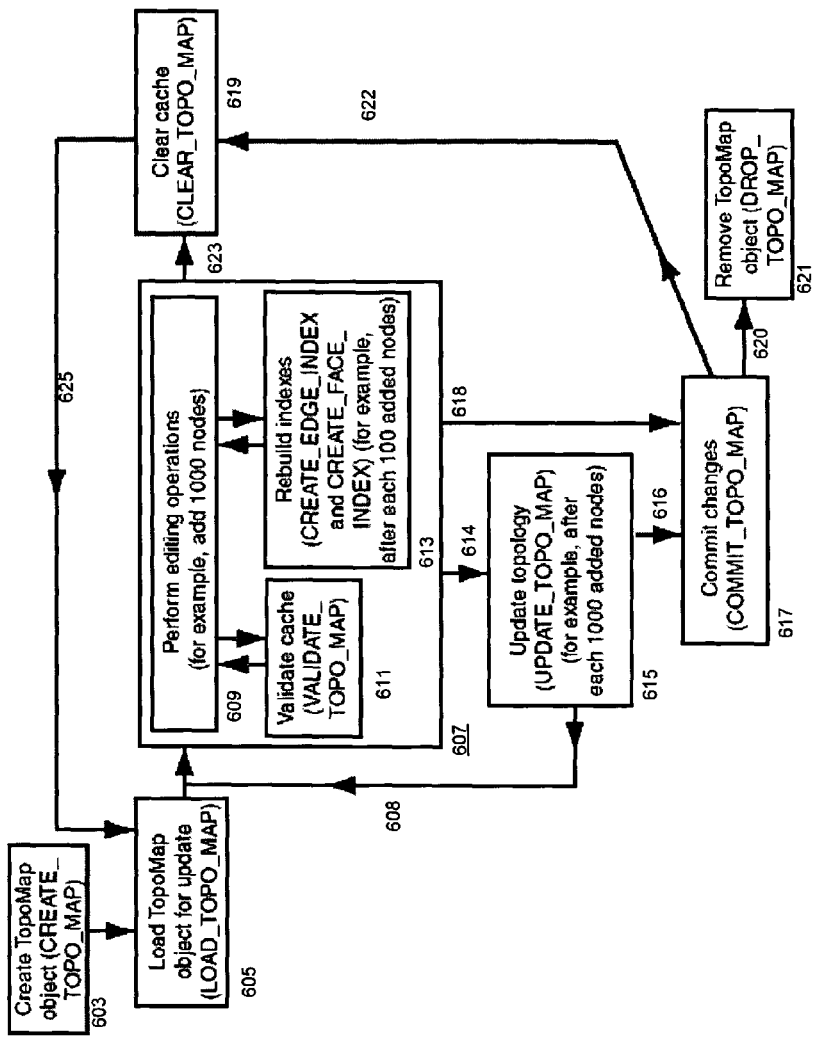
FIG. 6 is a flowchart of the operation of OTDM system 201 in topological editing mode.
Figure 7:
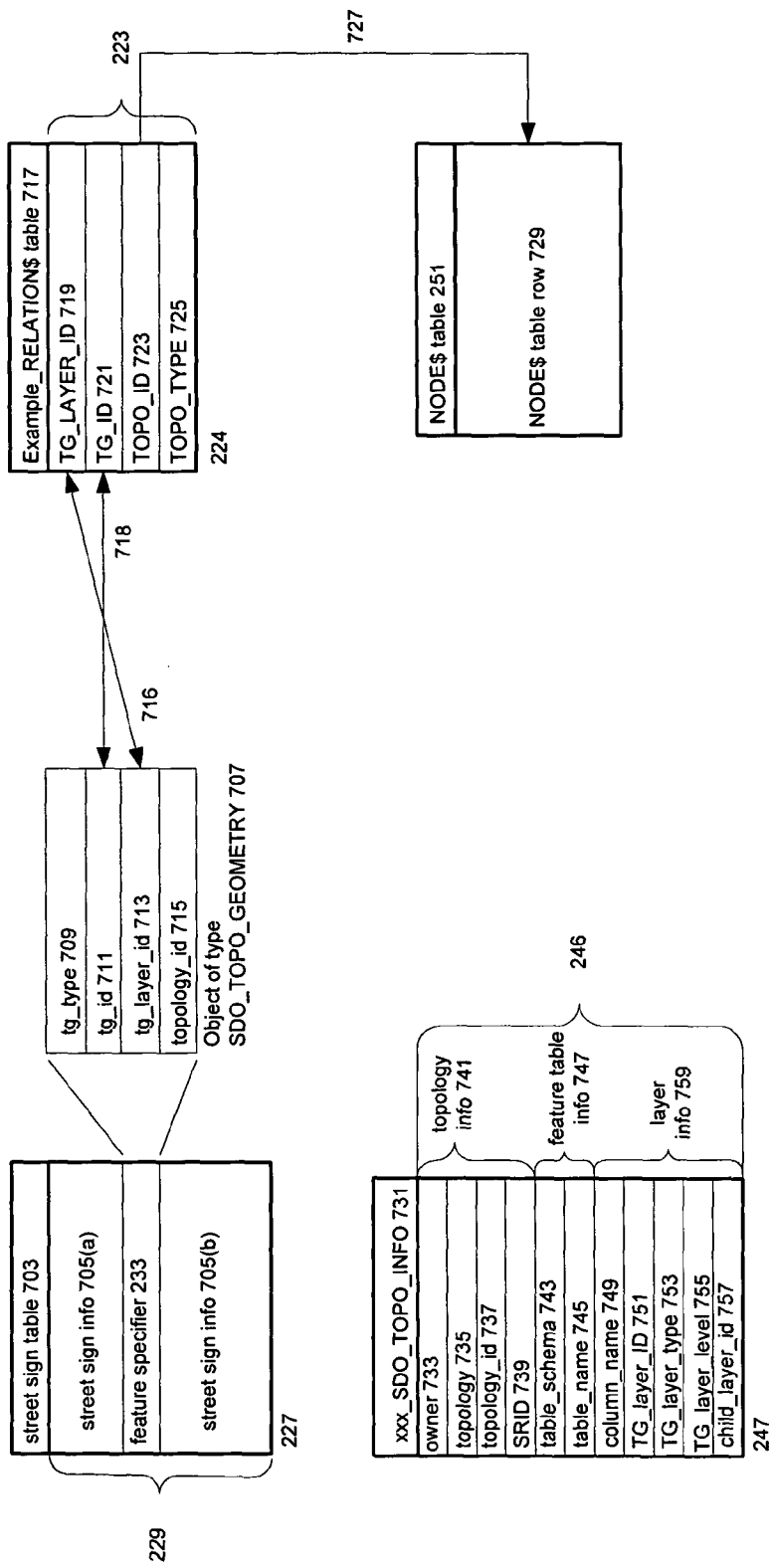
FIG. 7 is a detail of prior-art tables 227 and 224 and view 247.
Figure 8:
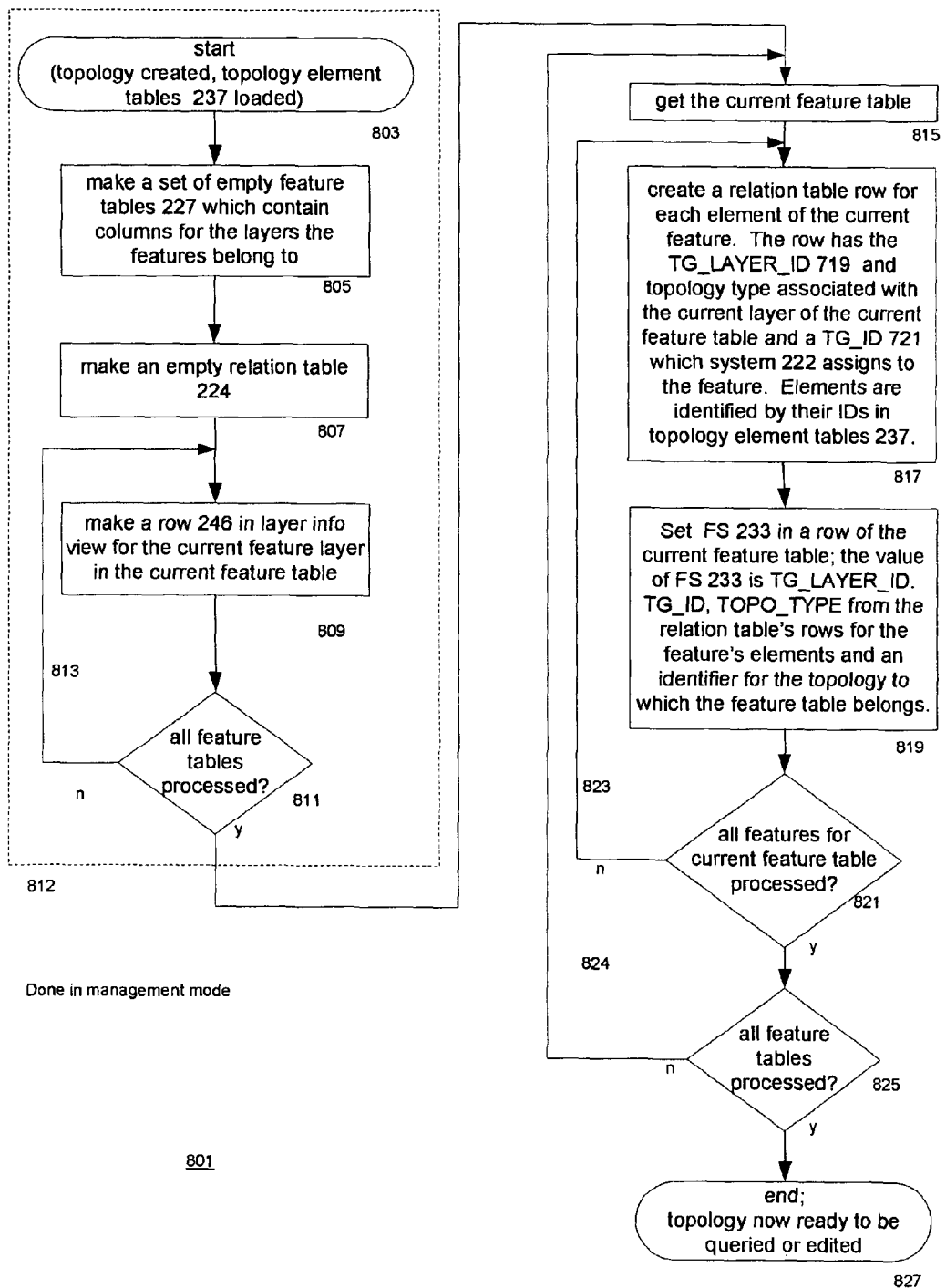
FIG. 8 is a flowchart of a prior-art technique for organizing elements into features in system 201.

Technique 901 then continues by loading the portion of the topology being modified to cache 215 (903), so that further processing of the features may be made in topological editing mode. Topological editing mode is required in a preferred embodiment because technique 901 adds the topology elements belonging to a feature to the cached portion of topology element tables 237 as it creates the feature. The advantage of doing this is that the topology can be periodically checked for consistency as shown in FIG. 6 as the new topology elements are added. Then for each of the feature tables, the technique performs loop 917, including decision block 915, and for each feature in the current feature table, the technique performs loop 913, including decision block 915. In loop 913, the features are processed by the layer to which they belong. For each feature, the technique first creates or reuses a row in the cached portion of topology element tables 237 for each new element of the feature (907). If the topology element already exists in topology element tables 237, the technique simply goes on to the next topology element of the feature. The elements are derived from a geometry object associated with the feature and the topological element data in cache 215. When the elements have been created or located, a set of topological element IDs associated with the feature is returned.

Next, the technique assigns a feature ID to the feature and creates a row in the cached copy of relation table 224 for each of the feature's elements, including those already present in topology element tables 237. The fields in the row contain the feature ID for the feature, the ID for the associated element in tables 237, the layer ID for the feature, and the feature's type. The layer ID and the type for the row come from layer info view 247 (908). Once the row has been created in relation table 224, the feature specifier 233 for the feature is inserted into the column of feature table 227 that corresponds to the layer the feature belongs to. The contents of the feature specifier come from the feature ID, layer ID, and feature type specified in the rows for the feature in relation table 224 and from the topology ID field for the layer in layer info view 247. (909). Once all of the features in all of the feature tables have been processed as just described, the topology with the newly-defined features is ready to be queried or edited (919).

Functions Which Create Features According to Technique 901: FIG. 10

In a preferred embodiment, the steps labeled 910 in technique 901 are performed by one of the functions shown at 1001 in FIG. 10. There are two such functions: function 1003 creates features whose elements are topology elements. In so doing, function 1003 makes rows for the feature's new topology elements in topology element tables 237, creates rows in relation table 224 which relate the feature to its topology elements, and returns a feature specifier 233 for the feature to be inserted into the field that belongs to the column for the feature's layer in the feature table.

Function 1005 makes features whose elements are features represented by a set of feature specifiers 233 in a child layer. For example, if there were a county feature table which had a row for each county in the US and a county_topology column whose values were FS's 233 for the county features, a state feature table which had a row for each state in the US and a state_topology column whose values were FS's for the state features, and the feature level of the county features was the child of the feature level of the state features, function 1005 could be used to make an FS 233 in the state_topology column in the Massachusetts row which represented the features represented by the FS 233s from the rows for the Massachusetts counties in the county feature table.

Details of Function 1003

Beginning with function 1003, the parameters for the function include at 1007 the name of the topology the feature table to which the feature specifiers 233 are being added belongs, at 1009 the name of the feature table itself, and at 1011 the name of the column that specifies the layer to which the new feature specifiers belong.

geom parameter 1013 is a geometric description of for the feature. The geometric description is stored in a single row, in a single column of object type SDO_GEOMETRY in a user-defined table. Tables of this sort are sometimes referred to as spatial tables or spatial geometry tables. The type definition looks like this:

```
CREATE TYPE sdo_geometry AS OBJECT (
    SDO_GTYPE NUMBER,
    SDO_SRID NUMBER,
    SDO_POINT SDO_POINT_TYPE,
    SDO_ELEM_INFO SDO_ELEM_INFO_ARRAY,
    SDO_ORDINATES SDO_ORDINATE_ARRAY);
```

SDO_GTYP specifies the type of the spatial object; SDO_SRID specifies the kind of coordinate system used to describe the object. The SDO_POINT_TYPE, SDO_ELEM_INFO_ARRAY, and SDO_ORDINATE_ARRAY types which are used in the SDO_GEOMETRY type definition are defined as follows:

```
CREATE TYPE sdo_point_type AS OBJECT (
    X NUMBER,
    Y NUMBER,
    Z NUMBER);
CREATE TYPE sdo_elem_info_array AS VARRAY (1048576) of
    NUMBER;
CREATE TYPE sdo_ordinate_array AS VARRAY (1048576) of
    NUMBER;
```

Function 1003 returns a feature specifier 233, which, as already pointed out, is an object of type SDO_TOPO_GEOMETRY.

Function 1003 works as described at 910 in FIG. 9. The function uses the geom parameter to create the rows for the feature's elements in topology element tables 237. The function that creates the rows returns the IDs in topology element tables 237 for the elements. Next, function 1003 makes rows in relation table 224 for the elements of the feature. In so doing, the function uses the topology, table_name, and column_name parameters in layer infoview 247 to find the row in the view for the layer that the feature belongs to and obtains the information for fields TG_LAYER_ID 719, and TOPO_TYPE 725 of relation table rows 223 for the feature elements from that row, obtains an identifier for the new feature from system 01 for field TG_ID 721 of the relations table rows, and places the ID for an element of the feature in TOPO_ID field 723. When all of the rows for the feature's elements have been made in relation table 224, the function makes and returns the feature specifier 233 for the feature.

Details of Function 1005

Function 1005 has the same parameters as function 1003 except for the last parameter, dml_condition 1015, which specifies the condition which is the basis for selecting rows of the feature table whose features are to be represented by an FS 233 for the of the parent layer. The child layer is specified at child_layer_id field 757 of the parent layer's entry 246 in layer info view 247. The value of field 757 can be used to locate the child layer's row in layer info view 247.

Function 1005 works as follows: to begin with, since the elements of the feature already exist in topology element tables 237, function 1005 does not perform step 907 of technique 901. Instead, it locates FS 233's for the feature in the rows of the child feature layer's feature table that satisfy the condition specified at dml_condition 1015. As each FS 233 is retrieved from a row which satisfies the condition, function 1005 makes a row for the element of the parent layer's feature represented by the returned FS 233 in the parent layer's feature in relation table 224. In these rows, the values TG_ID 721 and TG_LAYER_ID 719 are those of the parent layer's feature; rows 723 and 725 contain information specifying the rows in relation table 224 for the elements of the child layer feature. When rows for all of the new parent feature's elements have been added to relation table 224, the FS 233 for the new parent feature is made from the parent feature's TG_ID 721 and TG_LAYER_ID 721 in relation table 224 and the information for the parent row's type and topology in layer info view 247 and returned as described above with regard to function 1003. Function 1105 thus performs an aggregation operation on the features in the child layer which results in a FS 233 belonging to the parent layer which represents a selected set of the features belonging to the child level.

Examples of the Use of Function 1003 and 1005: FIG. 11

FIG. 11 shows an example of the use of function 1003 at 1101 and an example of the use of function 1005 at 1115.

Example of the Use of Function 1003

Beginning with example 1101, the example is a loop which inserts FS 233s into a feature table named traffic_signs that belongs to the topology CITY_DATA. traffic_signs is a table of traffic signs. It has at least two columns: a column for the traffic signs' names and a column for their FSs 233. At 1103 is a record sign_rec which has one field which is the name of the sign and another field of type SDO_GEOMETRY which contains the geometric description of the sign's feature. At 1109 is specified a spatial geometry table traffic_signs_geometry. This table has a row for each traffic sign and at least two columns, one for the name of the traffic sign and one for its geometry. Fields belonging to the latter row have the type SDO_GEOMETRY. As shown in the FOR ..LOOP clause at 1102, on each iteration of the loop, the next row in traffic_signs_geometry is read and the values of the row's name and geometry fields are read into sign_rec. In the INSERT INTO clause at 1110, values derived from the current values of sign_rec are inserted into the next row of traffic_signs. The values are inserted in the order of the fields in the row of traffic_signs. Here, the first value is the name of the traffic sign from sign_rec. name, and the second value is the FS 233 returned by function 1003. The function is invoked with the topology name CITY_DATA, the feature table name TRAFFIC_SIGNS, the feature column name FEATURE, and the current value of the geometry field in sign_rec. As described above, example 1103 creates rows for the feature's elements in topology element tables 237, rows for the feature in relation table 224, and returns the FS 233 for the feature. When the loop is finished executing, a feature for each of the traffic signs in traffic_signs_geom 1109 has been created and the traffic sign's name and the FS 233 for its feature have been inserted into rows in traffic_signs.

Example of the Use of Function 1005

In example 1115, SC 1127 is the name of a hierarchical topology with a state parent feature layer at level 1 and a county child feature layer at level 0. Assuming that a county feature table SC_AREAS 1129 that has a feature column for the features belonging to the county child feature layer has been populated with some county geometry objects using function 1003, this example demonstrates how function 1005 may be used to create a feature column that is associated with the state parent feature layer in the state feature table sc_p_areas 1117 using feature specifiers from the county feature table SC_AREAS 1129. Function 1105 performs an aggregation operation on the rows for those counties in the county child feature table that are associated with a particular state. As a result of the aggregation operation, a single FS 233 in the particular state's entry in sc_p_areas 1117 represents the features for all of the counties in the particular state.

The state feature table sc_p_areas 1117 in example 1115 has columns: f_name 1121 for a state abbreviation, p_name 1123 for a country abbreviation, and feature 1125 for FS's 233 for the state feature layer. There is a row in the state feature table for each state. The county feature table SC_AREAS 1129 has columns: FEATURE 1129 is the name of the county feature column, p_name in 1119 is the name of the state abbreviation column, and c_name (not shown in example 1115) is the name of the county name column.

'p_name="NH"' 1119 is a string specification of a dml_condition 1015, which specifies that only the FSs 233 from the county feature layer which are in rows in the county feature table in which the state abbreviation is 'NH' are to be selected by function 1005. Function 1005 is invoked at 1126 with parameter values: 'SC' 1127 for topology 1007, 'SC_AREAS' 1129 for a child feature table name 1009, 'FEATURE' 1131 for a feature column name 1011 in SC_AREAS, and p_name="NH"' 1119 for a dml_condition 1015. When function 1005 is executed in example 1115, a query is run on SC_AREAS to retrieve all of the rows for counties in New Hampshire. For each row, information in the FS 233 in FEATURE for the row is used to make a row in relation table 224 for that element of the feature represented by the new feature specifier in New Hampshire's row in sc_p_areas. The row in relation table 224 refers to the row in that table for the feature in SC The rows for the elements of the state feature in relation table 224 thus specify other rows in table 224 instead of TOPO IDs in topology element tables 237. After a successful execution, the function returns a FS 233 for the New Hampshire state feature in the state feature layer. The feature represented by the returned FS 233 specifies rows in relation table 224 for county features for all of the counties in New Hampshire. After function 1005 is executed at 1126, the SQL insert statement in example 1115 is executed. It inserts the FS returned from function 1005 in the row of the state feature table sc_p_areas 117 with the field values 'NH' and 'US'.

CONCLUSION

The foregoing Detailed description has disclosed to those skilled in the relevant technologies how to implement and use the inventive techniques for making feature specifiers as the topology elements represented by the feature specifier are added to the topology element table and for combining feature specifiers for sets of topology elements with feature specifiers for sets of features in a child feature layer. The inventors have further set forth the best mode presently known to them of practicing their techniques. It will, however, be immediately apparent to those skilled in the relevant technologies that there are many possible implementations of the principles of the inventive techniques. In particular, as disclosed herein, the inventive techniques are implemented in a preexisting relational database management system that has a preexisting topology data model and necessarily reflect characteristics of the relational database management system and of the topology data model in which they are implemented. Moreover, the forms of the APIs used to implement the inventive techniques fall into the realm of designer's choice. Further, as would be expected, the APIs, too, reflect the properties of the relational database system and the topology database model. The same can be said for the precise forms of the feature specifiers, the relations table, and the layer information view, as well as for the precise forms of the topology elements. For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. A computer implemented method of making a feature specifier that represents a feature, a feature corresponding to a set of topology elements in a topology data model that is defined in a relational database management system, the topology data model including a topology element table in the relational database management system having rows representing topology elements, and the method comprising:
using at least one processor that is to perform a process, the process comprising:
receiving a specification of the set of topology elements, wherein
the specification includes at least spatial information that comprises geographic information of the feature, and
at least a part of the set of topology elements belongs to the feature;
determining a first row for each of one or more non-existing topology elements of the set of topology elements that do not exist in the topology element table;
determining a second row in a relations table in the relational database management system, wherein the relation relates the first row to the feature specifier;
providing the feature specifier to represent at least the one or more non-existing topology elements of the feature in the topology data model based at least in part upon the relations table and the topology element table; and
organizing topology data including geographic data in the relational database management system into one or more additional features by using at least the feature specifier, which represents at least the one or more non-existing topology elements, without identification of the one or more non-existing topology elements pre-existing in the topology element table.

2. The computer implemented method set forth in claim 1, wherein
the topology data model further includes a feature table having a feature column whose values comprise feature specifiers, and
the process further comprises the action of:
inserting the feature specifier into a field belonging to the feature column in a row of the feature table.

3. The computer implemented method set forth in claim 2, wherein
the topology data model comprises a plurality of feature tables, and
the action of receiving the specification of the set of topology elements further comprises receiving a specification of at least one feature table of the plurality of feature tables and of a feature column of the at least one feature table.

4. The computer implemented method set forth in claim 3, wherein
a plurality of features represented by the feature specifiers in a given feature column of a given feature table make up a feature layer in the topology data model, and
the action of identifying or generating the second row further comprises relating the feature specifier to a specifier for the feature layer comprising the plurality of features represented by the feature specifiers in the given feature column of the given feature table.

5. The computer implemented method set forth in claim 4, wherein
the topology data model further includes a feature layer table, wherein a parent feature layer is related to a child feature layer,
the given feature specifier represents either a first feature that corresponds a first set of topology elements or a second feature that comprises a set of features from the child feature layer, and
the process further includes the actions performed as an alternative to the actions of claim 1 of:
receiving a first specification of the parent feature layer and a second specification of one or more features belonging to the child feature layer; and
generating a third row in the relations table for at least one feature in the set of features belonging to the child feature layer, the third row relating the at least one feature to the feature specifier, whereby a feature layer includes both a first feature that corresponds to a set of topology elements and a second feature that comprises a set of features from the child feature layer.

6. The computer implemented method set forth in claim 5, wherein
the second specification of the one or more features belonging to the child feature layer comprises description of a set of rows of a feature table of the child feature layer.

7. A storage device to which a processor may have access, the storage device being characterized in that:
the storage device includes non-transitory computer readable memory that includes code which, when executed in at least one processor, implements the computer implemented method set forth in claim 1.

8. Apparatus for making a feature specifier that represents a feature, the feature being a set of topology elements in a topology data model that is defined in a relational database management system, the topology data model including a topology element table in the relational database management system having rows representing topology elements, and the apparatus comprising:
at least one processor that is to:
receive a specification of the set of topology elements, wherein
the specification includes spatial information that comprises geographic information of the feature, and
at least a part of the topology elements belongs to the feature;
generate a first row for at least one of the set of topology elements in the topology element table;

identify or generate a second row in the relations table in the relational database management system, wherein the relation relates the second row to the feature specifier;

provide the feature specifier to specify the feature or another feature in the topology data model which is defined in the relational database management system when one or more rows including the second row have been made in the relations table for the set of topology elements; and organizing topology data including geographic data in the relational database management system into one or more additional features by using at least the feature specifier, which represents at least one or more non-existing topology elements that do not exist in the topology element table, without identification of the one or more non-existing topology elements pre-existing in the topology element table.

9. The apparatus set forth in claim 8, wherein
the topology model further includes a feature table having a feature column whose values comprise feature specifiers, and
the at least one processor is further to:
   insert the feature specifier into a field belonging to the feature column in a row of the feature table.

10. The apparatus set forth in claim 9, wherein
the topology data model comprises a plurality of feature tables, and
a topology feature creator is to receive a first specification of the feature table and the feature column of the feature table.

11. The apparatus set forth in claim 10, wherein
one or more features represented by one or more feature specifiers in a given feature column of a given feature table make up a feature layer in the topology data model,
one or more rows of the relations table further relate a feature layer specifier to the feature specifier, and
the at least one processor to identify or generate the second row comprises relating the feature specifier to the feature layer specifier for the feature layer that includes the one or more features represented by the one or more feature specifiers in the given feature column of the given feature table.

12. The apparatus set forth in claim 11, wherein
the topology data model further includes a feature layer table, wherein a parent feature layer is related to a child feature layer,
a given feature specifier represents either a first feature that corresponds to a first set of topology elements or a second feature that comprises a second set of features from the child feature layer, and
the at least one processor is further to:
   receive a first specification of the parent feature layer and a second specification of the second set of the features belonging to the child feature layer by using a parent layer feature creator;
   generate a third row in the relations table for at least one of a plurality of features in the second set of features belonging to the child feature layer, the third row relating the at least one of the plurality of features to the given feature specifier, and
   provide the given feature specifier, whereby the feature layer includes both the first feature that corresponds to the first set of topology elements and the second feature that comprises the second set of features from the child feature layer.

13. The apparatus set forth in claim 12, wherein
the second specification of the second set of the features belonging to the child feature layer comprises description of a set of the rows of the feature table of a child feature layer.

14. A computer implemented method employed with a topological data model which is defined in a relational database management system of populating a given feature layer with features, each of the features being either a topology element feature comprising topology elements specified in a topology element table in the topology data model or a child layer element feature whose elements are features specified in a child feature layer of the given feature layer, the child feature layer being defined in the topology data model, a feature specifier specifying a feature, and a feature layer being made up of the features specified by the feature specifiers in a feature column of a feature table of the relational data base management system, the method being performed in the relational database management system and comprising:

using at least one processor that is to perform a process, the process comprising:
   for a first feature of the features that is being added to the given feature layer and comprises a topology element feature:
      receiving a first specification of the given feature layer and a second specification of the topology elements that comprises topology elements of the topology element feature, wherein at least one of the first specification and the second specification includes at least first spatial information that comprises first geographic information of the first feature; and
      for a first feature specifier and an element of the topology element feature, generating a row in a relation table in the relational database management system that relates the first feature specifier to the element of the topology element feature;
   for a second feature of the features that comprises a child layer element feature,
      receiving a third specification of the given feature layer and a fourth specification of one or more features of the child feature layer that comprise elements of the child layer element feature, wherein at least one of the third specification and the fourth specification includes at least second spatial information that comprises second geographic information of the second feature; and
      for a second feature specifier and an element of the child layer element feature, generating a row in the relation table that relates the second feature specifier to the element of the child layer element feature;
   inserting the first feature specifier or the second feature specifier into the feature column of the feature table that defines the given feature layer; and
   organizing topology data including geographic data in the relational database management system into one or more additional features by using at least the feature specifier, which represents one or more non-existing topology elements that do not exist in the topology element table, without identification of the one or more non-existing topology elements pre-existing in the topology element table.

15. The computer implemented method set forth in claim 14, further comprising:
   for each element of the topology elements of the topology element feature, ensuring the topology element table comprises a row for the each element.

16. The computer implemented method set forth in claim 14, wherein
for the second feature that comprises the child layer element feature, the fourth specification comprises description of a set of the rows of a child feature layer's feature table.

17. A storage device to which a processor may have access, the storage device being characterized in that:
the storage device includes non-transitory computer readable memory that includes code which, when executed in the processor, implements the method set forth in claim 14.

18. An apparatus employed with a topological data model defined in a relational database management system for populating a given feature layer with features, each of the features being either a topology element feature comprising topology elements specified in rows of a topology element table in the topology data model or a child layer element feature whose elements are features specified in a child feature layer of the given feature layer, the child feature layer being defined in the topology data model, a feature specifier specifying a feature, and a feature layer being made up of the features specified by the feature specifiers in a feature column of a feature table of the relational data base management system, the apparatus comprising:
at least one processor that is to:
relate an element of a feature to a feature specifier for the feature using one or more rows of a relations table;
receive a specification of the given feature layer and of the topology elements of the topology element feature using a topology element feature creator, wherein the second specification includes spatial information that includes geographic information of the feature;
determine a row of the one or more rows in the relations table which relates a topology element's row to the feature specifier for the element that is specified in the specification;
provide the feature specifier after the row is generated in the relations table;
receive a first specification of a parent feature layer and a second specification of one or more elements of a child layer element feature, generating a first row in the relations table for at least one element of the child layer element feature, the first row relating the at least one element to the feature specifier;
provide the feature specifier after the row is generated;
insert the feature specifier provided by either the topology element feature creator or a child layer element feature creator into a field belonging to the feature column in a row of a feature table of the given feature layer; and
organizing topology data including geographic data in the relational database management system into one or more additional features by using at least the feature specifier, which represents at least the one or more non-existing topology elements, without identification of the one or more non-existing topology elements pre-existing in the topology element table.

19. The apparatus set forth in claim 18, wherein
for each topology element, the topology feature element creator ensures that the topology element table comprises one row for the topology element.

20. The apparatus set forth in claim 18, wherein
when the feature comprises a child layer element feature, the second specification of the one or more elements of the child layer element feature comprises a description of a set of the rows of a feature table of the child feature layer.

21. The computer implemented method of claim 1, in which the topology element table is empty prior to the action of determining the first row for the each of one or more non-existing topology elements.

22. The computer implemented method of claim 1, in which the relations table is empty prior to the action of determining the second row in the relations table.

23. The computer implemented method of claim 1, in which the at least one processor has no knowledge of identification of the each of one or more non-existing topology elements in the set prior to the action of determining the first row for the each of one or more non-existing topology elements.

24. The computer implemented method of claim 1, further comprising:
defining the feature for a first time on the relational database management system, wherein the at least a part of the set of topology elements belonging to the feature is absent from the topology element table; and
checking for consistency for the at least a part of the set of topology elements as the at least a part of the set of topology elements is being added to the relational database management system.

25. The computer implemented method of claim 1, in which the action of determining the first row comprises identifying or generating the first row for the each of the one or more non-existing topology elements of the set of topology elements in the topology element table in the relational database management system.

26. The computer implemented method of claim 1, in which the action of determining the second row in the relations table comprises identifying or generating the second row in the relations table in the relational database management system.

27. A computer implemented method for managing topology data in a database management system, the method comprising:
using at least one processor that is to perform a process, the process comprising:
identifying a specification of a set of topology elements, wherein the specification includes at least geographic information of a feature, and at least a part of the set of topology elements belongs to the feature;
identifying or determining a topology element table for a non-existing topology element, which does not exist in a topology element table;
identifying or determining a relations table that is in the database management system and relates the first row to a feature specifier associated with the feature;
providing the feature specifier to represent at least the non-existing topology element for the feature in a topology database of the database management system based at least in part upon a part of the relations table and the topology element table; and
organizing the topology data in the topology database into one or more additional features by using at least one or more SQL (structured query language) statements without identification of the non-existing topology element pre-existing in the topology element table.

28. The computer implemented method of claim 27, in which the act of organizing the topology data in the topology database into one or more additional features is performed within the database management system, rather than by an application outside the database management system.

29. The computer implemented method of claim 27, in which the act of organizing the topology data in the topology database into one or more additional features is performed within the database management system, rather than performing callbacks to an application programming interface that links to an application outside the database management system.

30. The computer implemented method of claim 27, in which the process further comprises:
identifying a database application of the database management system; and
organizing the topology data by using the database application to employ the one or more SQL statements and a first topology element, which does not exist in the topology element table, to add a new feature to the topology database through a new feature specifier for the new feature or to modify an existing feature through an existing feature specifier for the existing feature, without a first identification of the first topology element preexisting in the topology element table.

31. An article of manufacture comprising a non-transitory computer readable medium stored thereupon a sequence of instructions which, when executed by at least one processor, cause the process to perform a method for managing topology data in a database management system, the method comprising:
using the at least one processor that is to perform a process, the process comprising:
identifying a specification of a set of topology elements, wherein the specification includes at least geographic information of a feature, and at least a part of the set of topology elements belongs to the feature;
identifying or determining a topology element table for a non-existing topology element, which does not exist in a topology element table;
identifying or determining a relations table that is in the database management system and relates the first row to a feature specifier associated with the feature;
providing the feature specifier to represent at least the non-existing topology element for the feature in a topology database of the database management system based at least in part upon a part of the relations table and the topology element table; and
organizing the topology data in the topology database into one or more additional features by using at least one or more SQL (structured query language) statements without identification of the non-existing topology element pre-existing in the topology element table.

32. The article of manufacture of claim 31, in which the act of organizing the topology data in the topology database into one or more additional features is performed within the database management system, rather than by an application outside the database management system.

33. The article of manufacture of claim 31, in which the act of organizing the topology data in the topology database into one or more additional features is performed within the database management system, rather than performing callbacks to an application programming interface that links to an application outside the database management system.

34. The article of manufacture of claim 31, in which the process further comprises:
identifying a database application of the database management system; and
organizing the topology data by using the database application to employ the one or more SQL statements and a first topology element, which does not exist in the topology element table, to add a new feature to the topology database through a new feature specifier for the new feature or to modify an existing feature through an existing feature specifier for the existing feature, without a first identification of the first topology element preexisting in the topology element table.

35. A system for managing topology data in a database management system, comprising:
at least one processor that is at least to:
identify a specification of a set of topology elements, wherein the specification includes at least geographic information of a feature, and at least a part of the set of topology elements belongs to the feature;
identify or determining a topology element table for a non-existing topology element, which does not exist in a topology element table;
identify or determining a relations table that is in the database management system and relates the first row to a feature specifier associated with the feature;
provide the feature specifier to represent at least the non-existing topology element for the feature in a topology database of the database management system based at least in part upon a part of the relations table and the topology element table; and
organize the topology data in the topology database into one or more additional features by using at least one or more SQL (structured query language) statements without identification of the non-existing topology element pre-existing in the topology element table.

36. The system of claim 35, in which the at least one processor is at least to organize the topology data by performing organization of the topology data in the topology database into one or more additional features within the database management system, rather than to call an application outside the database management system for the organization of the topology data.

37. The system of claim 35, the at least one processor is at least to organize the topology data by performing organization of the topology data in the topology database into one or more additional features within the database management system, rather than to call back an application programming interface that links to an application outside the database management system.

38. The system of claim 35, in which the at least one processor is further to:
identify a database application of the database management system; and
organize the topology data by using the database application to employ the one or more SQL statements and a first topology element, which does not exist in the topology element table, to add a new feature to the topology database through a new feature specifier for the new feature or to modify an existing feature through an existing feature specifier for the existing feature, without a first identification of the first topology element preexisting in the topology element table.

* * * * *

UNITED STATES PATENT AND TRADEMARK OFFICE
CERTIFICATE OF CORRECTION

PATENT NO. : 8,438,186 B2  
APPLICATION NO. : 11/293486  
DATED : May 7, 2013  
INVENTOR(S) : Lee

Page 1 of 1

It is certified that error appears in the above-identified patent and that said Letters Patent is hereby corrected as shown below:

On Title page, in column 2, under "Other Publications", line 13, delete "1Og" and insert -- 10g --, therefor.

Figure 1:
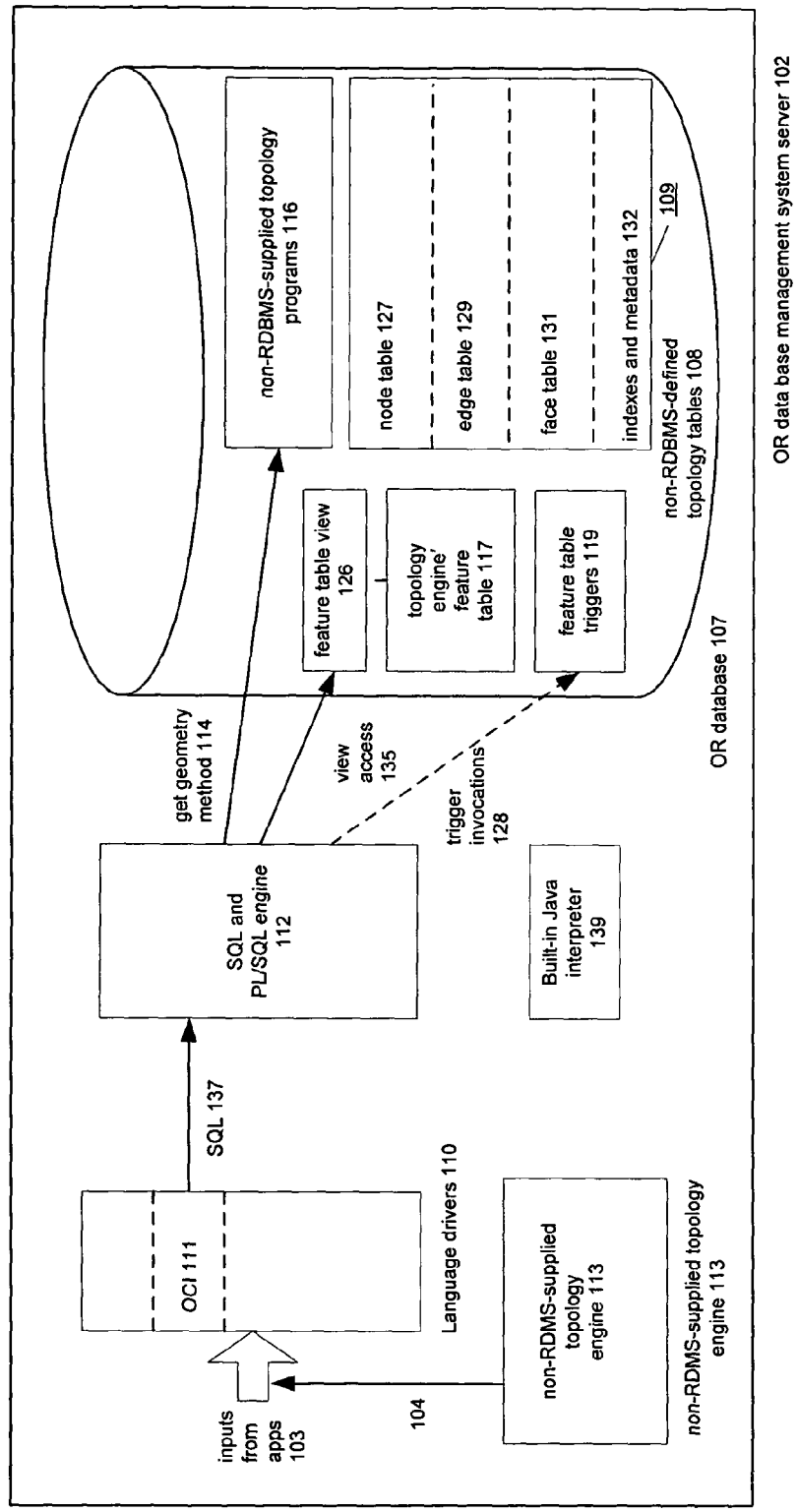
FIG. 1 is a block diagram of a prior art system for dealing with features in topology data.
Figure 2:
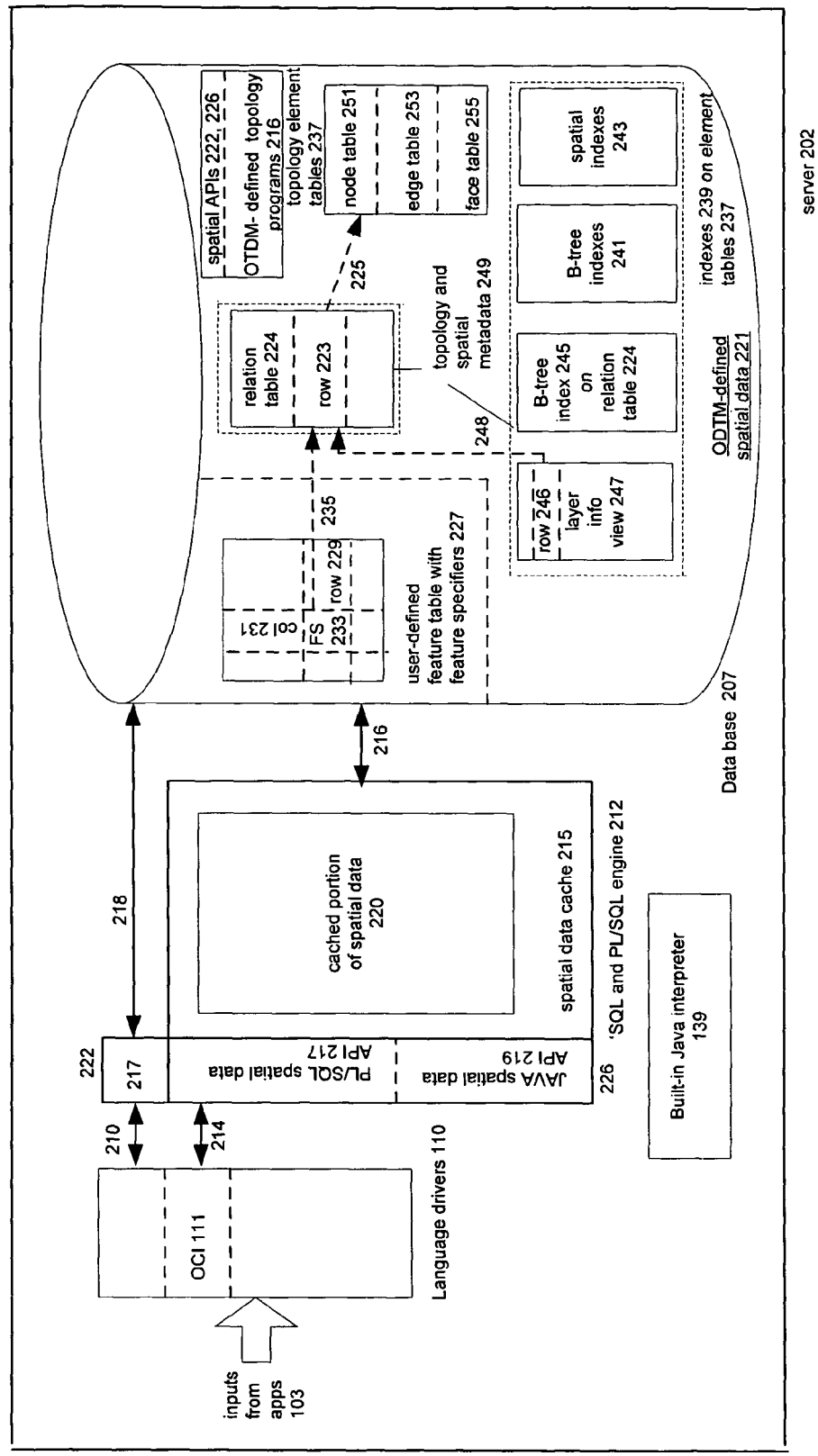
FIG. 2 is a block diagram of another prior-art system for dealing with features in topology data.
Figure 3:
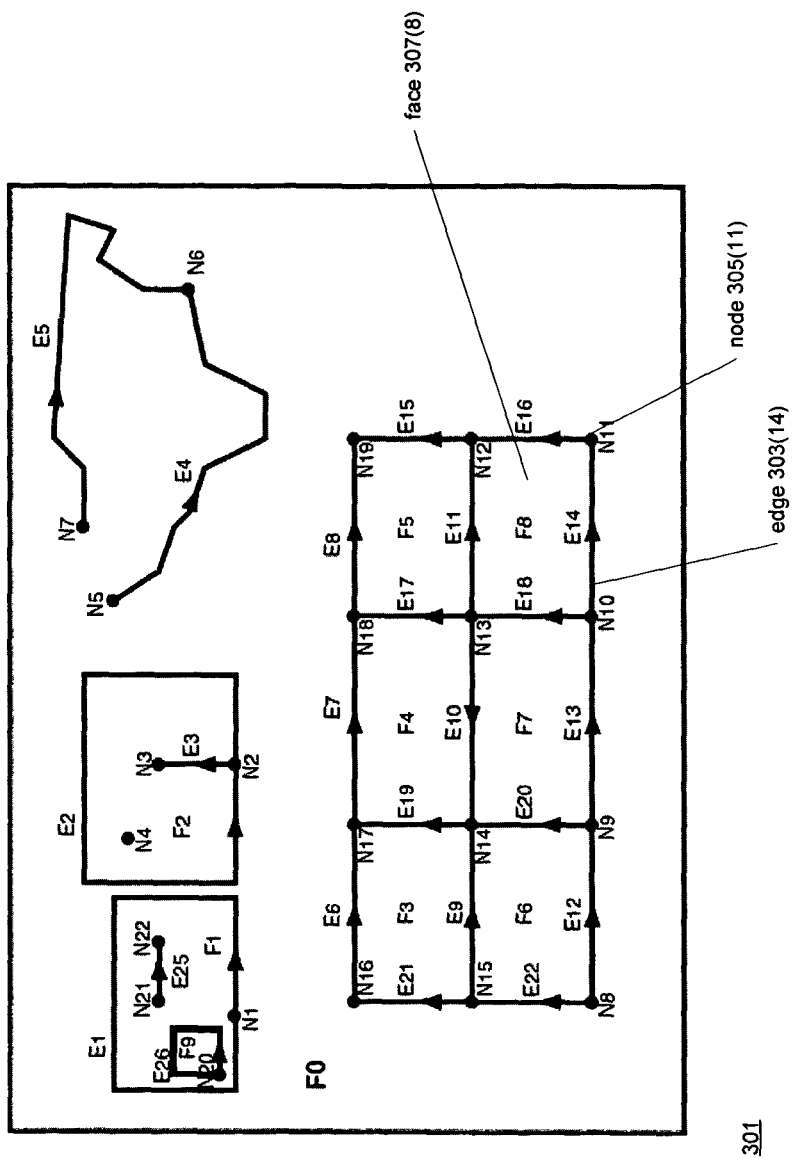
FIG. 3 shows a simple example topology.
Figure 4:
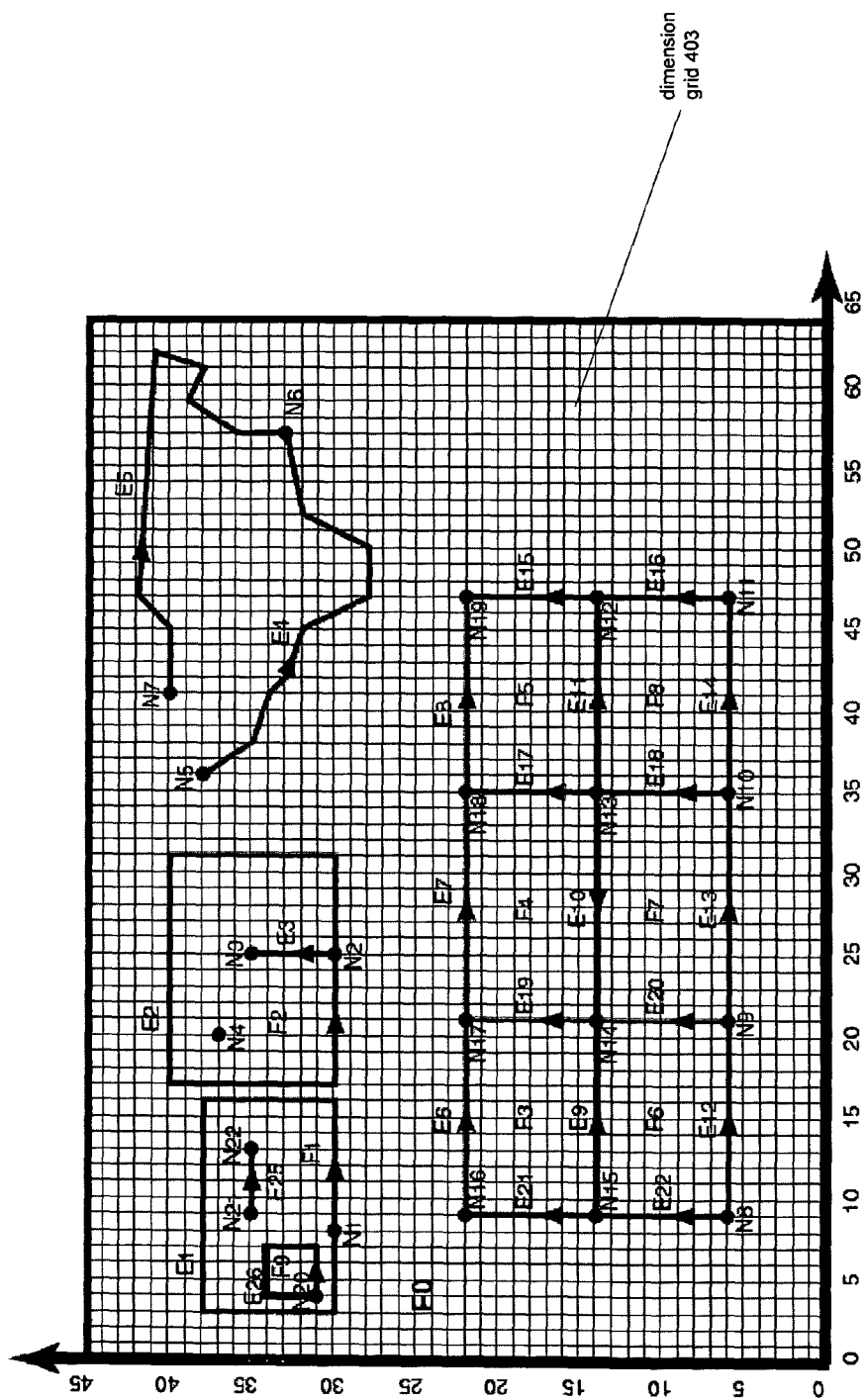
FIG. 4 shows how a dimension grid may be applied to the topology of FIG. 3.
Figure 5:
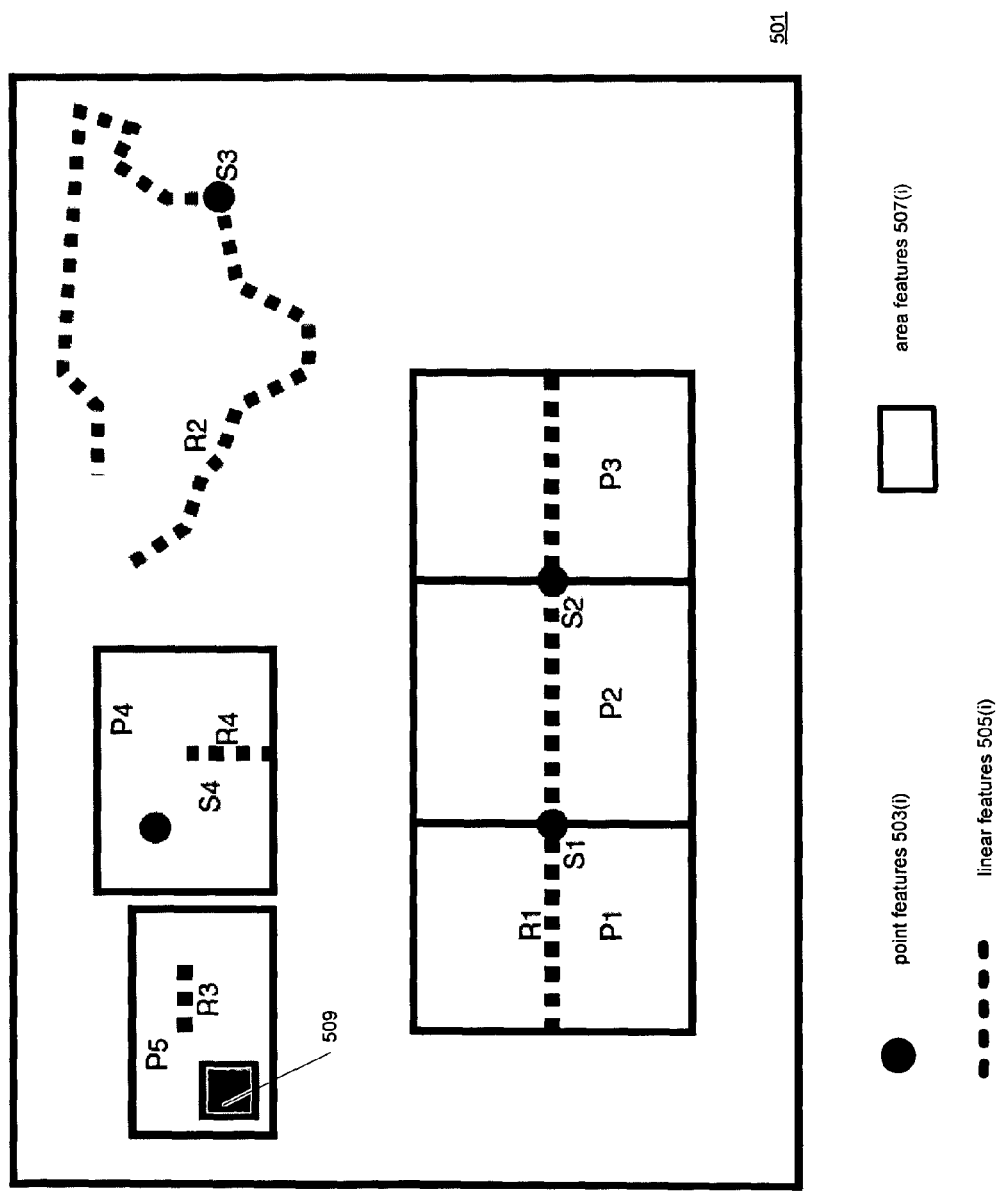
FIG. 5 shows how features may be defined in the topology of FIG. 3.

In the Drawings:

On sheet 2 of 11, in figure 2, Referral Numeral 221, line 1, delete "ODTM" and insert -- OTDM --, therefor.

In the Specification:

In column 6, line 6, delete "spatial" and insert -- Spatial --, therefor.

In column 8, line 54, delete "parcels'" and insert -- Parcels' --, therefor.

In column 14, line 15, delete "geom" and insert -- Geom --, therefor.

In column 14, line 31, delete "GTYP" and insert -- GTYPE --, therefor.

In column 15, line 6, after "233" delete "for the".

Signed and Sealed this
Seventeenth Day of September, 2013

Teresa Stanek Rea  
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,438,186 B2 | Page 1 of 1 |
| APPLICATION NO. | : 11/293486 | |
| DATED | : May 7, 2013 | |
| INVENTOR(S) | : Lee | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1733 days.

Signed and Sealed this
Sixteenth Day of December, 2014

Michelle K. Lee
*Deputy Director of the United States Patent and Trademark Office*